A. E. BLOCK.

SUPPORT FOR THE ANTERIOR METATARSAL ARCH OF THE FOOT.

APPLICATION FILED DEC. 20, 1915.

Reissued Mar. 1, 1921.

15,053.

Attest.
C. B. Yoder.
N. E. Brockman.

Inventor
Alexander E. Block
By James L. Hopkins,
Attorney.

UNITED STATES PATENT OFFICE.

ALEXANDER E. BLOCK, OF ST. LOUIS, MISSOURI.

SUPPORT FOR THE ANTERIOR METATARSAL ARCH OF THE FOOT.

15,053. Specification of Reissued Letters Patent. Reissued Mar. 1, 1921.

Original No. 1,127,349, dated February 2, 1915, Serial No. 699,512, filed May 24, 1912. Application for reissue filed December 20, 1915. Serial No. 67,901.

*To all whom it may concern:*

Be it known that I, ALEXANDER E. BLOCK, a citizen of the United States, and a resident of St. Louis, Missouri, have invented certain new and useful Improvements in Supports for the Anterior Metatarsal Arch of the Foot, of which the following is a specification.

My invention relates to improvements in supports for the anterior metatarsal arch of the foot, and has for its object to provide a flexible and adjustable support for the anterior metatarsal arch of the human foot, to be seated in a shoe.

In the drawings—

Figure 1:
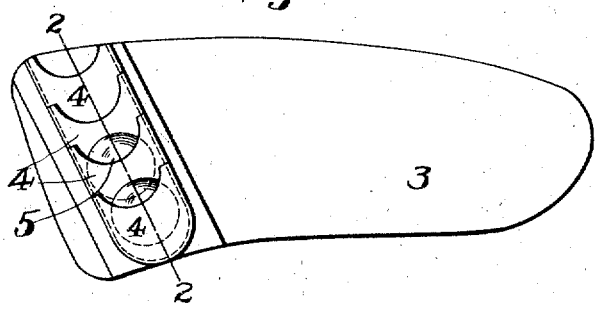
Figure 1 is a bottom plan view of a support embodying my invention.

As shown in the drawings, I employ a flexible insole or supporting member 3, which is adapted to be loosely seated in the shoe of the wearer, its length being such that it extends from a point beneath the heel of the wearer, to a line beneath the anterior metatarsal arch of his or her foot, being a line located shortly to the rear of the ball of the foot. Upon the lower face of the insole 3 I provide a series of overlapping pockets 4—4, each of which is adapted to receive and hold one or more of the thickeners or inserts 5; the pockets 4—4 being arranged as shown in the drawing transversely to the insole 3, the mouths of the pockets 4—4 being open toward the side of the insole 3. By means of this construction, I am enabled to shift the inserts 5 from one to the other of the pockets 4, or to provide one or more of said inserts for each of said pockets, as the condition of the anterior metatarsal arch of the wearer may indicate; the adjustment enabling the user to adjust the thickness of the support into conformation with the requirement of the wearer's foot, which requirement may be due to natural malformation, to accident or to disease. The inserts 5 are of any desired conformation, and may be of any width and thickness which the pockets 4 will accommodate. They need not fit closely in the pocket 4 because of the location of the mouths of the said pockets, and because when once in place they are held in place by the pressure of the foot of the wearer. The dimensions of the pockets, however, may be varied to accommodate various conditions of the anterior metatarsal arch, so that both the conformation and dimension of the pockets 4 and inserts 5 are immaterial, and may be made as desired without departing from my invention.

The adjustment of the thickness of the insole may be accomplished by securing the inserts 5 in place beneath the insole 3 by any suitable means, but preferably by non-adhesive means, which will permit the removal or shifting of the inserts 5 to any desired point along the line of the anterior metatarsal arch of the wearer.

Figure 2:
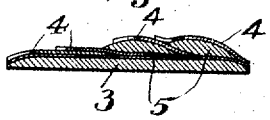
Fig. 2 is a transverse sectional view of the same, taken on the line 2—2 of Fig. 1.

As shown in the drawings, the inserts 5 and pockets 4 may be of such conformation as to permit said inserts 5, when seated in place, to assume an overlapping position, so providing a broader support for the part of the arch requiring such treatment than that afforded by a single insert (see sectional view, Fig. 2). The series of pockets 4 is arranged transversely beneath the flexible insole 3 and each pocket serves as a retaining mechanism to keep one or more inserts or thickeners in place beneath a particular point or part of the wearer's anterior metatarsal arch which requires treatment. I am aware that insoles have heretofore been made of two layers of material having transverse lines of stitching whereby a padding material was quilted into place, or a filling member held in a single position; and I disclaim the invention of such structures, none of which was adapted to the treatment of the anterior metatarsal arch; my invention relating to the treatment of that arch by means permitting one or more inserts to be temporarily and movably mounted or secured at various points beneath said arch.

The form and structure of pockets illustrated in the drawings is not material to my invention, as the essential element is the insert, and that insert may be formed as desired and secured in various isolated, or grouped or overlapped positions upon the insole by any desired and equivalent holding means, other than pockets, without departing from my invention.

As shown in the sectional view, Fig. 2, the device of my invention is adjustable in thickness at that point beneath the arch which is under treatment without disturbing or varying the thickness of the structure toward or at its outer marginal edges.

Thus, as shown in Fig. 2, the two pockets 4 at the left are in flattened or collapsed condition while the two of said pockets 4 at the right having been provided with inserts 5 give increased thickness to my structure at that part of the insole 3 alone. Thus I provide a local thickening that cannot be accomplished by a single insert thrust beneath the insole from either of its outer marginal edges.

Having thus described my invention, what I claim as new and desire to have secured to me by the grant of Letters Patent, is—

1. In a device of the class described, the combination of a flexible insole mounted beneath the anterior metatarsal arch of the foot of the wearer, and a series of superimposed and overlapping members forming pockets mounted on the lower face of said insole, and insert members adapted to be removably seated in said pockets.

2. In a support for the anterior metatarsal arch, a flexible insole in combination with an insert and means for detachably holding said insert to the insole at any one of various points along the line of the anterior metatarsal arch.

3. In a support for the anterior metatarsal arch, a flexible insole, a transverse line of pockets beneath said insole and along the line of the anterior metatarsal arch, and an insert adapted to be seated in any one of said pockets.

4. In a support for the anterior metatarsal arch, a flexible insole; a series of inserts; and means for holding said series of inserts in overlapped position upon said insole along the line of said arch.

5. In a device of the class described, in combination, a flexible insole having a portion located beneath the anterior metatarsal arch of the wearer; a series of pockets adjacent to each other and arranged transversely beneath said arch; and inserts adapted to be removably seated in said pockets.

6. In a support for the anterior metatarsal arch, the combination of an insole; a series of inserts; and means for temporarily holding one or more of said inserts on the insole, beneath the anterior metatarsal arch of the wearer.

7. In a support for the anterior metatarsal arch, a flexible insole; a series of inserts; and means for holding said series of inserts in overlapping position at various points upon said insole along the line of said arch.

8. In a support for the transverse arch of the foot, the combination of a flexible insole having a portion located beneath the anterior metatarsal arch of the foot of the wearer, and means for adjusting the thickness of the insole at a plurality of areas along the line of said anterior metatarsal arch, substantially as described.

In testimony whereof I have signed my name to this specification.

ALEXANDER E. BLOCK.